United States Patent [19]
Carter et al.

[11] Patent Number: 6,044,825
[45] Date of Patent: Apr. 4, 2000

[54] LOW PRESSURE GAS VAPORIZER AND METHOD OF OPERATION

[75] Inventors: Steven A. Carter, Mississauga; Michael Knappers, North York; Neil M. Khadim, Kitchener, all of Canada

[73] Assignee: GFI Control Systems, Inc., Ontario, Canada

[21] Appl. No.: 08/803,672

[22] Filed: Feb. 21, 1997

[51] Int. Cl.[7] .................................................. F02M 31/00
[52] U.S. Cl. ............................................................ 123/557
[58] Field of Search ................................. 123/557, 543, 123/546, 547, 545, 549

[56] References Cited

U.S. PATENT DOCUMENTS

| | | | |
|---|---|---|---|
| 2,821,843 | 2/1958 | Mengelkamp et al. | 123/557 |
| 3,184,295 | 5/1965 | Baverstock | 123/557 |
| 4,349,001 | 9/1982 | Wagner | 123/557 |
| 4,519,258 | 5/1985 | Redele | 123/557 |
| 4,554,520 | 11/1985 | Lindenmaier et al. | 123/557 |
| 4,722,314 | 2/1988 | Martinson | 123/557 |
| 4,979,483 | 12/1990 | Ray | 123/557 |
| 5,036,825 | 8/1991 | Stone | 123/557 |
| 5,076,243 | 12/1991 | Dale | 123/557 |
| 5,314,007 | 5/1994 | Christenson | 123/557 |
| 5,483,943 | 1/1996 | Peters | 123/557 |

FOREIGN PATENT DOCUMENTS 1326726  9/1989  Canada .
2131108  3/1996  Canada .

OTHER PUBLICATIONS

IMPCO Model L repair kit instruction booklet for IMPCO regulator and vaporizer.
IMPCO Model E repair kit instruction booklet for IMPCO regulator and vaporizer.
Brochure of Catherm.
IMPCO'Web Page (Model L) for regulator and vaporizer, May 1984.
IMPCO'Web Page (Model E) for regulator and vaporizer, May 1984.

*Primary Examiner*—Marguerite McMahon
*Attorney, Agent, or Firm*—Fitzpatrick, Cella, Harper & Scinto

[57] ABSTRACT

A fuel vaporizer and method of fuel vaporization are described for use with a fuel such as propane, that is know to tend to liquefy at low temperatures and to vaporize at high temperatures. The vaporizer and method described pertain to a series of internal walls and cavities which promote heat-exchange and transfers heat from a fluid engine coolant to the fuel. The transfer of heat and vaporization of fluid occurs by virtue of movement of the fuel through a series of countercurrent passages created by the walls and cavities, with increasing cross-sectional dimensions in the passages to accomodate the expansion of fuel from the liquid to the gaseous state. The heat is transferred by conduction across a metallic interface which forms part of the vaporizer and which separates the fuel from the coolant.

33 Claims, 9 Drawing Sheets

LOW PRESSURE GAS VAPORIZER AND METHOD OF OPERATION

FIELD OF THE INVENTION

This invention relates to a vaporizer that can be used with low pressure gaseous fuel in motor vehicles and the like to convert the fuel from liquid to vapour for purposes of combustion and a method of use for the same. While the vaporizer and method are described as being used with propane, the invention can be used with any low pressure gaseous fuel that is in the gaseous state at atmospheric pressure and room temperature, such as natural gas.

BACKGROUND OF THE INVENTION

There is currently a retail price advantage to using propane or natural gas as a fuel in motorized vehicles. Indeed, vehicles which are manufactured to operate on a primary fuel such as gasoline may be converted to operate on one of two or more alternative sources of fuel such as natural gas or propane.

Gaseous fuels such as propane and natural gas are generally stored in pressurized cylinders in which the gas is a manageable volume. Propane is a fuel which is in the gaseous state when at atmospheric pressure and room temperature (NPT). Where conditions of use are cold enough, propane pressure (partial pressure) will drop, with the result that most of any propane in a container will be in the liquid state. As a result propane pressure above the liquid/gas interface will be very low. This is problematic particularly when propane is used as a fuel source for a motorized vehicle used in locations where cold winter temperatures occur. Furthermore, as a container of propane, or other such fuel, is consumed the partial pressure of the gas drops which leads to difficulties in providing a constant pressure for the delivery of fuel to a fuel consuming device such as an automobile engine.

Previous low pressure gas vaporizers suffer from many disadvantages in that they are either too large; too inefficient, or too expensive to manufacture. Furthermore, they do not deliver propane gas at a substantially constant pressure, nor are they self-adjusting with temperature; and they cannot be used to start an engine at cold temperatures of, for example, less than 15° C. As well, they are not sufficiently reliable over a wide temperature range to be used in motor vehicles; they do not permit a sufficiently quick start to be used in motor vehicles; nor are they sufficiently safe to be used in motor vehicles. Consequently there is a need for a combination shut-off valve, vaporizer and pressure regulator which is self-adjusting for optimal fuel delivery regardless of ambient temperature.

SUMMARY OF THE INVENTION

In order to overcome these problems of the prior art, according to one aspect of the present invention there is provided a device which is a combination of shut-off valve, vaporizer and pressure regulator that is capable of providing reliable operation over a wide temperature range which includes extremely cold conditions under which the partial pressure of a fuel like propane is very low.

According to the present invention, it is desirable to provide a fuel vaporizer for use with fuel that tends to liquefy at low temperatures and to vaporize at high temperatures, a vaporizer having heat-exchange means adapted to transfer heat from a fluid engine coolant to the fuel, wherein heat is transferred by conduction across a metallic interface which forms part of the vaporizer and which separates the fuel from the coolant, wherein the vaporizer defines for the fuel a path which the fuel travels while heat transfer takes place.

According to a further aspect of the present invention, there is provided a device and method particularly designed for use with an engine adapted to burn propane or the like, although it is not considered to be restricted to that use.

According to another aspect of the present invention, in the case of use with an engine, there is provided a device which makes use of heat extracted from engine coolant in order to promote vaporization of fuel from the liquid state although other heat sources can be used such as fuel oil in the engine. As a further example, under low temperature conditions where inadequate coolant heat may be available, a device of the present invention can use positive temperature coefficient (PTC) electrical heaters to supplement coolant heat, either continuously or until the heat and coolant reach a high enough temperature to provide adequate heating without the addition of electric heat.

A characteristic of this invention relates to the design of the path along which a fuel travels as it collects heat from a coolant. Generally, fuel follows a three-part path with a gradually increasing cross-section to accommodate increased volume of gas due to vaporization of the liquid phase, although, a multiplicity of paths may be incorporated. As such, in accordance with one aspect of the present invention, there is provided a path along which fuel travels wherein a first part of the path is a single sinuous passage into which fuel can be sprayed from an inlet fuel chamber. This is followed by a pair of sinuous passages having a combined cross-section greater than that of the first sinuous passage, and disposed such that fuel moves along the pair of passages in a direction opposite to the movement of fuel in the first passage. Finally, a third portion of the fuel path involves three sinuous passages disposed such that the fuel therein travels in a direction opposite to the travel in the pair of passages, the cross-sectional area of the three sinuous passages in this part being greater than the combined cross-section of the pair of passages.

According to one aspect of the present invention there is provided a fuel vaporizer for use with fuel that tends to liquefy at low temperatures and to vaporize at high temperatures, the vaporizer having a heat source to heat the fuel within the vaporizer, said vaporizer having a path along which the fuel travels while heat transfer takes place, the path includes in the order encountered by the fuel, a chamber for receiving the fuel; and a sinuous passage located adjacent to the chamber, but substantially separated from it by a wall which defines a plurality of small-diameter apertures through which fuel in the chamber can be sprayed against a wall of the passage, this passage has a blind end in one direction and an open end in a direction opposite to the blind end, the passage divides into more than one passage and increases in volume towards the open end as it winds across the vaporizer to gradually vaporize said fuel.

According to one embodiment this invention provides a fuel vaporizer for use with a fuel that tends to liquefy at low temperatures and to vaporize at high temperatures, the vaporizer having heat-exchange means adapted to transfer heat from a fluid engine coolant to the fuel, wherein heat is transferred by conduction across a metallic interface which forms part of the vaporizer and which separates the fuel from the coolant. The vaporizer defines for the fuel a path along which the fuel travels while heat transfer takes place. The path encountered by the fuel as it passes through the vaporizer is as follows. Firstly there is provided a chamber for receiving, the fuel. This is followed by a single, sinuous passage adjacent to the chamber but substantially separated from it by a wall which defines a plurality of small-diameter apertures through which fuel in the chamber can be sprayed against a wall of the passage. This passage has one blind end, and another end toward which the fuel travels. A the other end the passage branches into two portions through which it communicates with a pair of sinuous passages generally parallel with each other and with the single sinuous passage, but disposed such that fuel contained in the pair of sinuous passages travels generally in the opposite direction from fuel travel in the single sinuous passage. The cross-sectional area of the combination of the pair of sinuous passages is greater than that of the single sinuous passage so as to permit expansion of the volume of the fuel as it gradually vaporizes due to the heat input. The downstream end of the pair of sinuous passages communicates with ends of a triplicity of sinuous passages which themselves are generally parallel with each other and with the pair of sinuous passages but are disposed such that fuel contained in them travels generally in the opposite direction from fuel travel in the pair of sinuous passages. The cross-sectional area of the combination of the triplicity of sinuous passages is greater than that of the pair of sinuous passages, so as to permit further expansion of the volume of the fuel as it continues to vaporize due to the heat input.

According to a further aspect of the present invention there is provided a fuel vaporizer for use with a fuel that tends to liquefy at low temperatures and to vaporize at high temperatures, the vaporizer having a heat source to provide heat to the fuel in the vaporizer. This vaporizer comprises a chamber for receiving the fuel and a passage located adjacent to the chamber, but being substantially separated from it by a wall which defines a plurality of small-diameter apertures through which fuel in the chamber can be sprayed against a wall of the passage, where the passage has a blind end in one direction and an open end in a direction opposite to the blind end. The passage increases in volume towards the open end as it winds across the vaporizer to gradually vaporize the fuel. This vaporizer also contains an outlet with a pressure regulator located in the outlet such that the regulator provides a means to control the pressure of the fuel leaving the outlet at a substantially constant level.

Additionally, in accordance with the present invention it is desirable to provide a fuel vaporizer for use with a fuel, such as propane, that tends to liquefy at low temperatures and to vaporize at high temperatures. According to one aspect of the present invention this vaporizer has a body comprising means defining a first path for the flow of engine coolant therethrough; means defining a second path for the flow of fluid fuel therethrough; means defining a heat-exchanger through which heat can be transferred from the coolant to the fuel by conduction across a metallic interface which forms part of the vaporizer and which separates the fuel from the coolant. The second path for the flow of fuel includes the following, in the order encountered by the fuel. Firstly there is provided a chamber for receiving, the fuel. This is followed by a single, sinuous passage adjacent to the chamber but substantially separated from it by a wall which defines a plurality of small-diameter apertures through which fuel in the chamber can be sprayed against a wall of the passage. This passage has one blind end, and another end toward which the fuel travels. A the other end the passage branches into two portions through which it communicates with a pair of sinuous passages generally parallel with each other and with the single sinuous passage, but disposed such that fuel contained in the pair of sinuous passages travels generally in the opposite direction from fuel travel in the single sinuous passage. The cross-sectional area of the combination of the pair of sinuous passages is greater than that of the single sinuous passage so as to permit expansion of the volume of the fuel as it gradually vaporizes due to the heat input. The downstream end of the pair of sinuous passages communicates with ends of a triplicity of sinuous passages which themselves are generally parallel with each other and with the pair of sinuous passages but are disposed such that fuel contained in them travels generally in the opposite direction from fuel travel in the pair of sinuous passages. The cross-sectional area of the combination of the triplicity of sinuous passages is greater than that of the pair of sinuous passages, so as to permit further expansion of the volume of the fuel as it continues to vaporize due to the heat input.

It is furthermore desirable to provide, in accordance with the present invention a method of vaporizing a fuel that tends to liquefy at low temperatures and to vaporize at high temperatures, utilizing a vaporizer having a heat source to heat the fuel within the vaporizer. The method comprises the following steps. Firstly passing the fuel into a chamber defined by the vaporizer; then passing the fuel into a sinuous passage located adjacent to the chamber, but substantially separated therefrom by a wall which defines a plurality of small-diameter apertures through which fuel in said chamber can be sprayed against a wall of said passage, said passage having a blind end in one direction and an open end in an opposite direction, said passage dividing into more than one passage and increasing in volume towards said open end as it winds across said vaporizer to gradually vaporize said fuel due to heat input.

According to a further aspect, this invention provides a method of vaporizing, a fuel that tends to liquefy at low temperatures and to vaporize at high temperatures, utilizing a vaporizer having, heat-exchange means adapted to transfer heat from a fluid engine coolant to the fuel, wherein heat is transferred by conduction across a metallic interface which forms part of the vaporizer and which separates the fuel from the coolant. The method comprises the following steps. Firstly the fuel is passed into a chamber defined by the vaporizer. It is then passed into a single, sinuous passage adjacent to the chamber but substantially separated from it by a wall which defines a plurality of small-diameter apertures, by spraying, the fuel through the apertures against a wall of the said single passage. Next, the fuel is passed into a pair of sinuous passages generally parallel with each other and with the single sinuous passage, whereby the fuel travels generally in the opposite direction from fuel travel in the single sinuous passage. The cross-sectional area of the combination of the pair of sinuous passages is greater than that of the single sinuous passage; This is to permit expansion of the volume of the fuel as it gradually vaporizes due to the heat input. The fuel is then passed into a triplicity of passages generally parallel with each other and with the pair of sinuous passages, but disposed such that fuel contained in them travels generally in the opposite direction from fuel travel in the pair of sinuous passages. The cross-sectional area of the combination of the triplicity of sinuous passages is greater than that of the pair of sinuous passages so as to permit further expansion of the volume of the fuel as it continues to vaporize due to the heat input. According to a further aspect of this embodiment of the invention there is provided a method of controlling the pressure of the fuel leaving the vaporizer at a substantially constant level.

As will be seen, the device described below demonstrates enhanced performance characteristics when compared to conventional technology.

In particular, the vaporization scheme provides high surface to volume ratio on both the fuel and coolant sides of the heat exchanger section. This design has about 3.5 times the surface to volume ratio (fuel side) of conventional regulators. Further, the layout of the vaporizer forces all of the fuel to pass through the entire sequence of heat exchanging sections, whereas conventional regulators can allow partially vaporized fuel to by-pass heat exchange sections. Moreover, the sequence of obstructions and sinusoidal passages has the effect of continually forcing liquid fuel against the hot walls of the vaporizer section. In a similar fashion the layout of the coolant side is also greatly enhanced compared to current technologies in order to maximize heat extraction from the coolant.

A device in accordance with the present invention has enhanced cold start vaporization capability due to: (1) reduced operating pressure at low temperatures; and (2) the presence of the cold start electrical heaters which are tied to specific heat transfer fins at the end of the vaporization section. Furthermore, this device contains high surface to volume ratios in all of the coolant and fuel channels. As a result, all of the flow channels are smaller, which produces a much smaller package. Compared to examples of conventional designs, a vaporizer of the present invention has approximately 25% more surface area and approximately 25% longer fuel path length but occupies only approximately 35–40% of the volume of current devices.

In addition there is good pressure control due to the use of a balanced second stage regulating, mechanism, the use of convoluted rolling diaphragms, and a check valve configuration to prevent over pressure from being trapped inside the regulator.

This device has the ability to work well at low input pressures because it incorporates a large second stage orifice which minimizes the pressure drop in the second stage. As well, the design of the second stage valve allows the device to go full open at low pressures thereby further minimizing the pressure drop. Finally, a preferred embodiment uses a thermally actuated modulator to drop to a second, lower regulated pressure, at low temperatures thereby further improving the reliability of pressure regulation.

The design of the present embodiment of the device reduces the size of the fuel flow passages thus reducing the trapped volume of fuel contained in the device at any time. This is beneficial in that it reduces the amount of fuel that could potentially leak out past the second stage seat (i.e. when device is shut-off); the amount of trapped fuel that could vaporize and potentially vapor-lock the device; and the amount of fuel that could potentially be vented to the atmosphere by the PRV.

Finally, devices incorporating current technology are very prone to vapor lock. The device of this invention provides a combination of reduced trapped volume, a balanced second stage valve, and a series of check valves all of which serve to reduce the potential for a vapor lock of the device.

BRIEF DESCRIPTION OF THE DRAWINGS

One embodiment of this invention is illustrated in the accompanying drawings, in which like numerals denote like parts throughout the several views, and in which.

DESCRIPTION OF A PREFERRED EMBODIMENT

Figure 1:
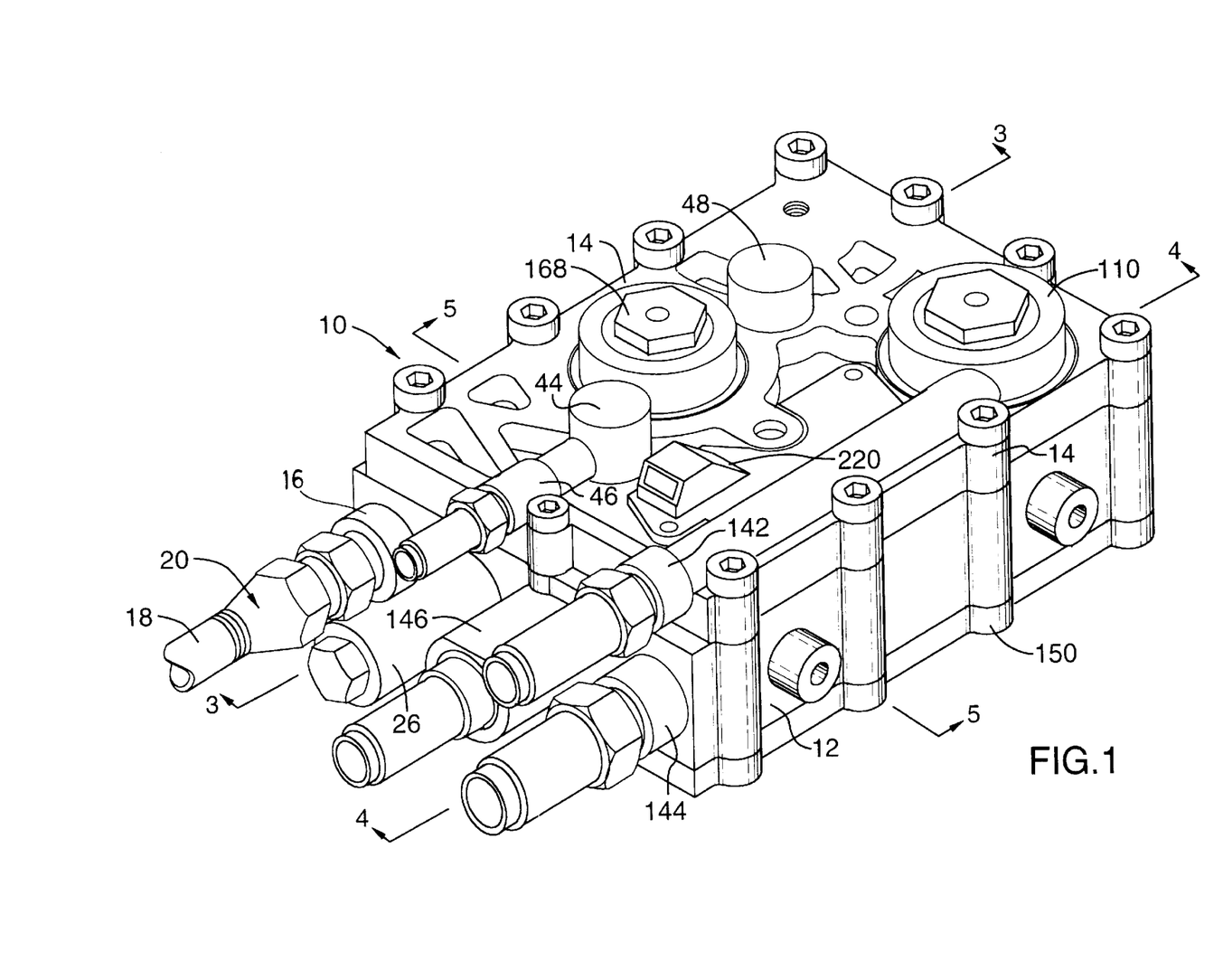
FIG. 1 is a general perspective view, taken obliquely from above, showing the combination device embodying the present invention.

An illustration of a preferred embodiment a device of the present invention 10 is provided in FIG. 1. Generally, this device is a combination shut-off valve, vaporizer and pressure regulator. The inlet 16 includes a normally closed, electrically operated solenoid valve which, in the de-energized state, prevents the flow of fuel from the fuel tank. The solenoid 26 also acts as a check valve (at all times), relieving, moderate overpressure conditions by allowing, a "blow down" into the fuel tank. Extreme overpressure conditions are protected by a separate pressure relief valve 44 (typically vented to the atmosphere).

In this device, fuel is vaporized using heat extracted from engine coolant (or other suitable source). Under low temperature conditions where inadequate coolant heat may be available the device uses PTC electrical heaters (FIG. 4, 93, 94 and 95) to supplement the coolant heat. This heat supplement may be applied continuously, or, until the heat and the coolant reach a high enough temperature to provide adequate heating without further addition of electric heat. In the device's simplest form, heat transfer from the coolant is uncontrolled. However, an optional solenoid can cyclically interrupt coolant flow in order to control gas outlet temperature to a specific schedule.

While the present regulator is nominally a two-stage device, it has three unique operating modes, and provides several different output pressures. Depending upon coolant temperature, it may act as either a fixed restriction, a one-stage regulator, or a two-stage regulator. In normal (warm) modes, two-stages of pressure regulation are active and provide nearly constant output pressure, regardless of inlet pressure or outlet flow rate. In cold modes, a temperature-actuated modulator reduces the control pressure to a second lower pressure, and the regulator has one stage of active regulation. However, as the supply pressure is low during those times, the regulator still provides relatively constant output pressure. In extremely cold conditions (where supply pressure is very low), both stages of regulation are in their full-flow positions, and the regulator appears as a fixed restriction to flow. In that case, outlet pressure varies with supply pressure and output flow rate.

The device incorporates a number of unique features which enhance both safety and performance. Among these is an integral pressure relief valve 44 which protects the assembly in the case of dangerously high overpressure. Additionally, check valves across both stages (42, FIG. 2 and 140, FIG. 5) assure that any overpressure condition (within or downstream of the device) can be quickly, and safely relieved by venting to the tank or to the atmosphere.

Referring now in detail to FIG. 1 which represents the complete operative condition of the device, there is provided a perspective view of the overall device 10 which consists of a main heat exchanger body 12, a top cover 14 and a bottom cover 150. Liquid fuel enters at 16, winds its way through the device and emerges in the gaseous state at 142. Engine coolant enters the device at 146, passes through the heat exchanger body on the coolant side of the device and exits at 144.

Figure 2:
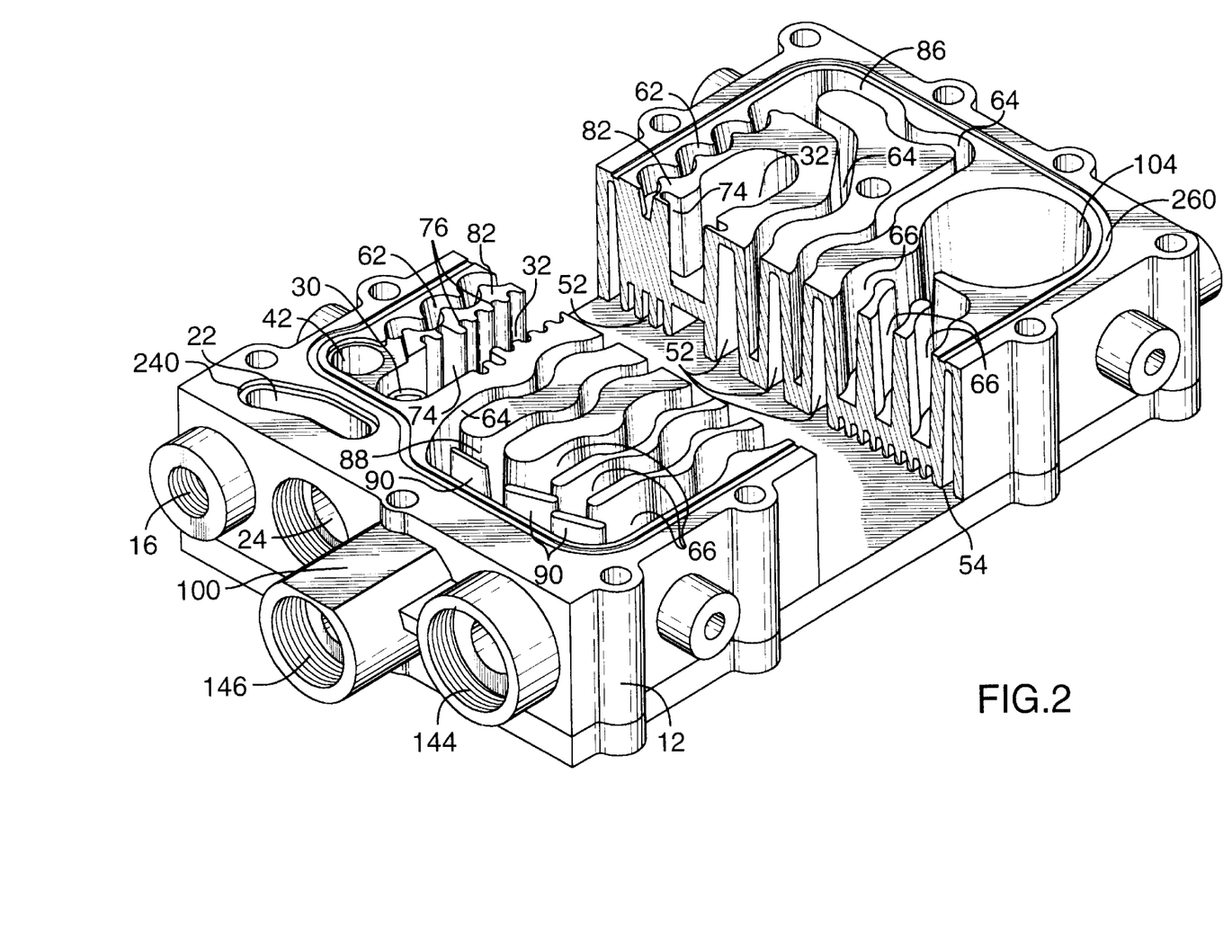
FIG. 2 is a perspective, cross-sectioned and separated view, taken obliquely from above showing the heat-exchanger component of the present invention.

FIG. 2 shows only the main heat exchanger body 12, in a sectioned and separated condition, the cover 14 having been removed.

Referring simultaneously to FIGS. 1 and 2, there is provided a fuel inlet port 16 through which fuel enters the device 10. In FIG. 1, the inlet port 16 is shown connected to a fuel inlet pipe 18 by a suitable coupling 20.

Figure 3:
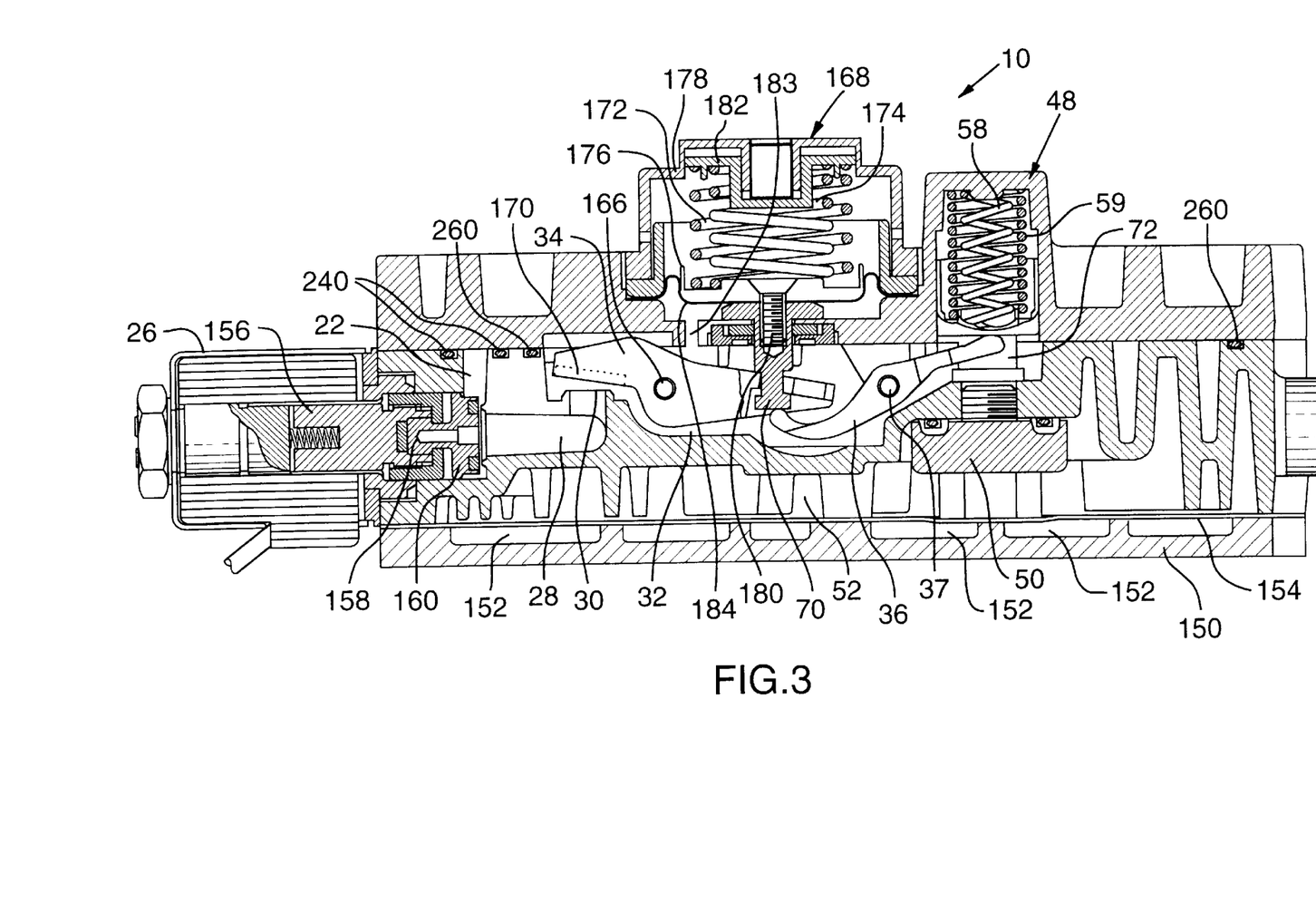
FIG. 3 is a vertical sectional view of the device, taken at the lines 3—3 in FIGS. 1, 2 and 6.

After entering the fuel inlet port 16, the fuel (which is largely liquid at this stage) passes along an internal transfer port 22 and into a chamber (hidden from view but appearing in cross section at FIG. 3) surrounding an opening, 24 intended to receive a solenoid-controlled inlet valve shown externally in perspective at 26 in FIG. 1 and appearing in axial vertical sectional view in FIG. 3. The port 22 is elongated to interconnect port 16 with opening 24. Elastomeric rings 240 and 260 which reside in recesses which surround the transfer port and vaporizer heat exchange areas ensure a tight seal between the exchanger body 12 and cover 14.

The inlet solenoid valve 26 will be described in greater detail at a later point in this description, but for now it is enough to understand that the inlet solenoid 26 controls the flow of liquid fuel along an internal passageway 28, best seen in FIG. 3, which communicates with a fuel delivery aperture 30 opening into a preliminary fuel chamber 32. The fuel chamber 32 is shown in perspective in FIG. 2, and includes portions on both sides of the section and view.

Referring again to FIG. 3, located within the fuel chamber 32 are two levers 34 and 36, which in combination control fuel entry into the chamber 32 over a large temperature range. Specific construction of the levers 34 and 36 will be described at a later point in this description.

A first stage spring-operated check valve 40 (FIG. 5) provided in a vertical bore 42 (FIG. 2) relieves overpressure in the first stage back to the inlet chamber of the solenoid 26 (the channel for pressure relief is hidden from view).

Referring again to FIG. 1, a spring operated pressure relief valve 44 is contained within the top cover 14, and relieves any severe overpressure conditions to an external port 46, also forming part of the top cover 14.

Figure 9:
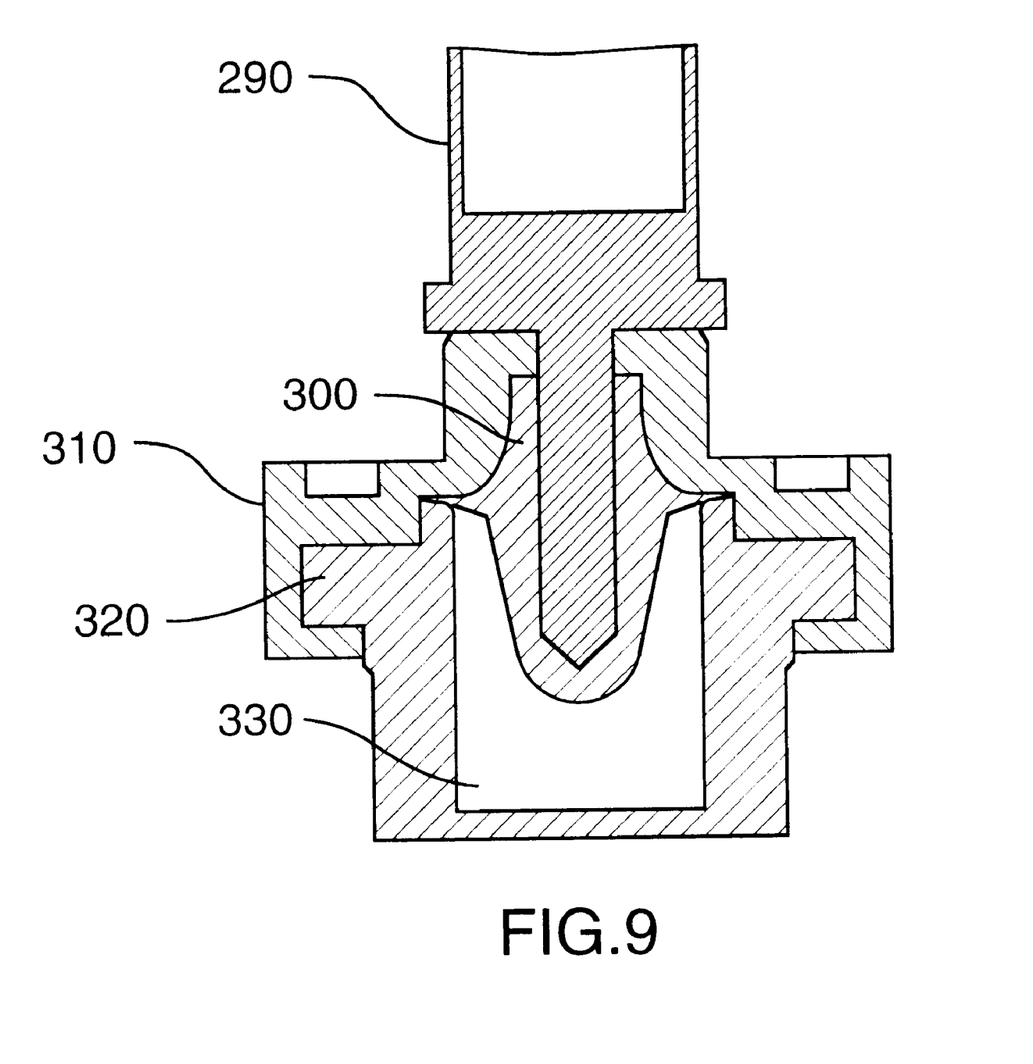
FIG. 9 is a cross-sectional view of the wax element shown in FIG. 3.

At low temperatures, a first stage pressure modulator 48 acts to reduce the first stage "set pressure", employing a wax element 50 (FIG. 3, detail at FIG. 9). The operational details of this portion will be described subsequently.

Figure 6:
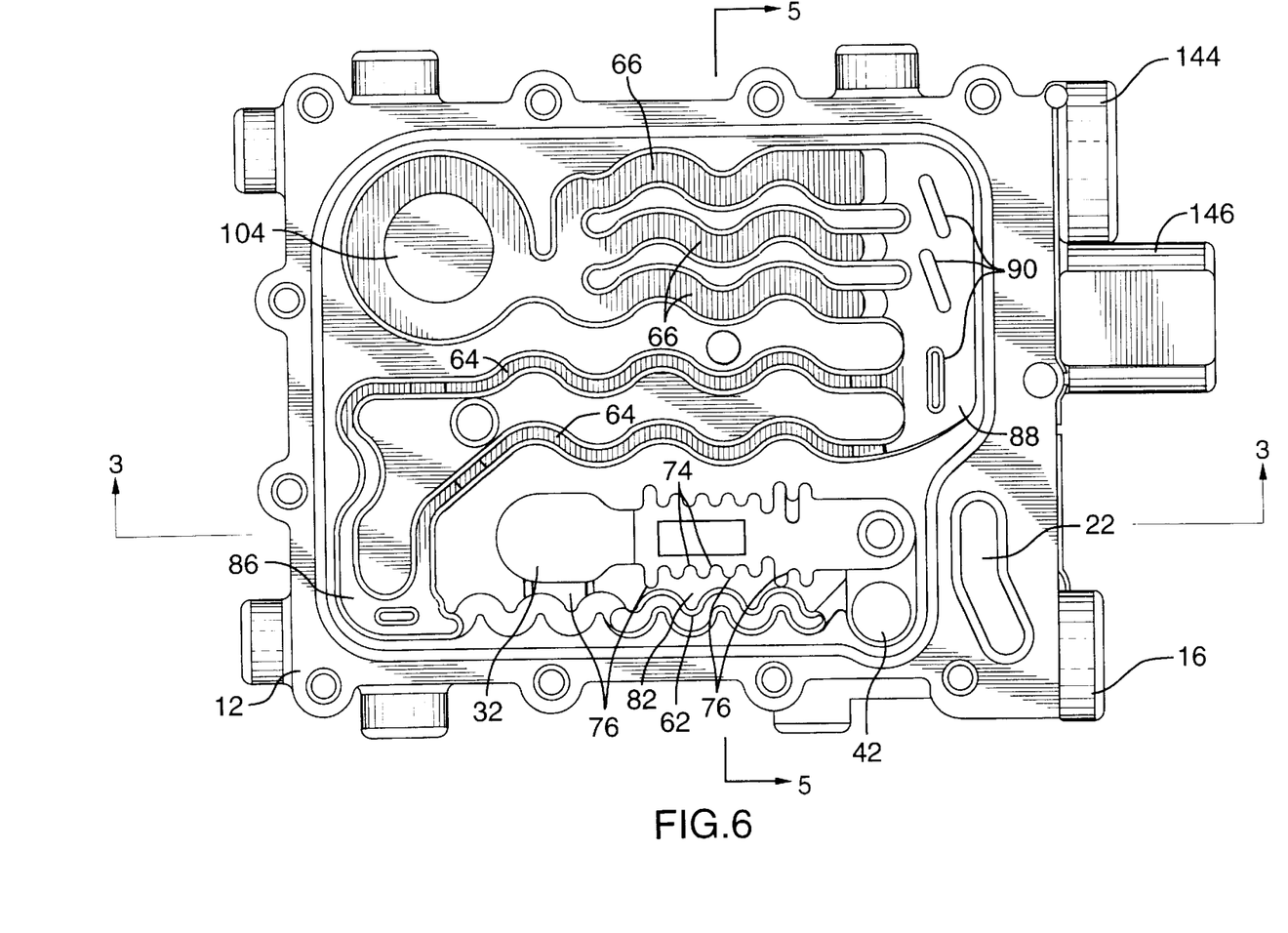
FIG. 6 is a top plan view of the heat-exchanger portion of the device corresponding to FIG. 2.

Attention is now directed to FIGS. 2 and 6 for a description of the various passages along which the fuel which is initially in the liquid state passes, and in which it is essentially vaporized by extended intimate contact with the "hot" walls of the vaporizer section.

Figure 4:
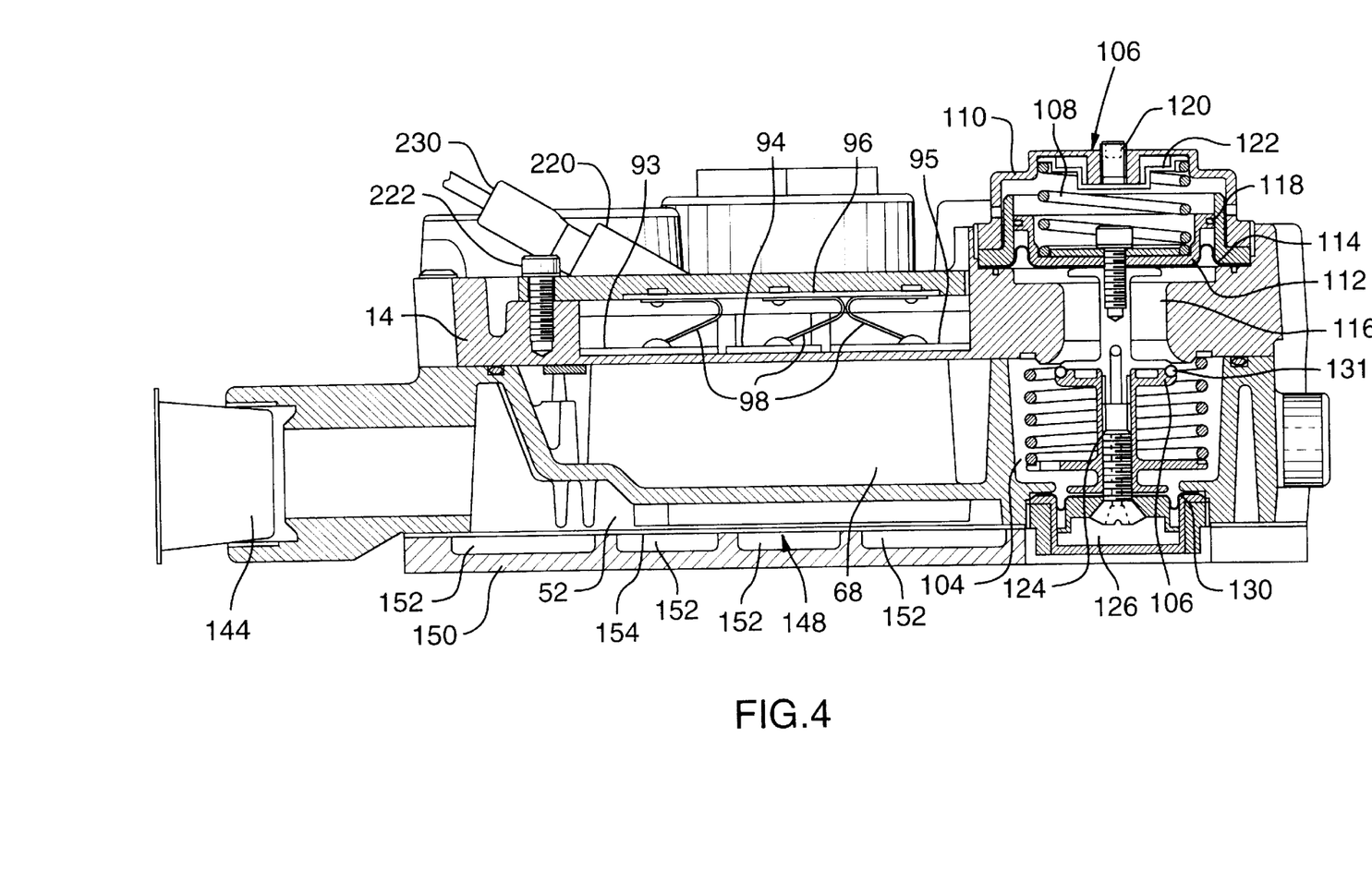
FIG. 4 is a vertical sectional view of the device, taken where shown at the lines 4—4 in FIGS. 1 and 2.

Looking at FIG. 2, it is to be understood that the engine coolant which traverses this device in order to provide heat to vaporize the fuel, is constrained within a bottom compartment generally identified by the numeral 52 in FIG. 4, and that the compartment 52 is in full communication with the underside of the section shown in FIG. 2 at the numeral 52. Thus, the engine coolant passes into the interstices between the various ribs, slots, and so on which can be seen at the underside of the section 54 in FIG. 2.

Vaporization requires time, temperature, and a specific quality of contact between a fluid and the surface from which it is deriving heat. Accordingly, the vaporizer section of the device described herein is designed to provide long contact times, high surface-to-volume ratio exposure of the fluid to hot surfaces, and high contact "forces". The fluid fuel is repeatedly broken into successively smaller streams, exposed to obstructions for generating turbulence, forced to turn corners, forced into long periods of oscillating, high-acceleration motion (generally sinusoidal), and forced through narrow channels (i.e. high surface-to-volume ratio). Before exiting the vaporizer section, the fluid fuel passes through a final centrifuge chamber to separate out any remaining liquid droplets. Throughout the vaporizer section, the turns and high acceleration sinusoidal channels act to separate the liquid and gas by throwing the higher density liquid portions out against the hot walls. Referring generally to FIGS. 2 and 6, in overview terms, the path of the fuel as it passes through the vaporizer section can be described as follows:

(a) There is an initial dispersion into high surface-to-volume chamber 32;

(b) 90° path change and expulsion through a plurality of parallel jets 76

Figure 5:
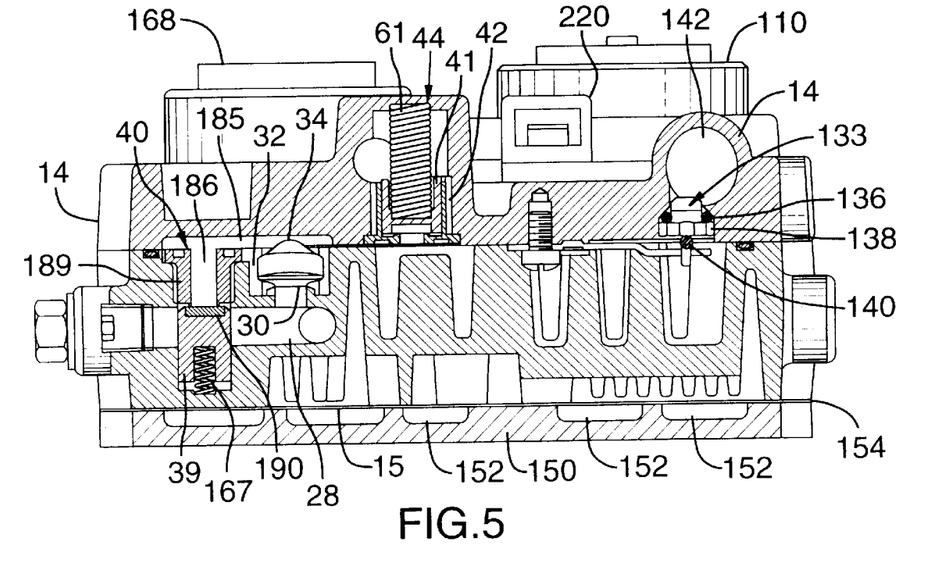
FIG. 5 is a cross-sectional view taken at the lines 5—5 in FIG. 1 and in FIG. 6.
Figure 7:
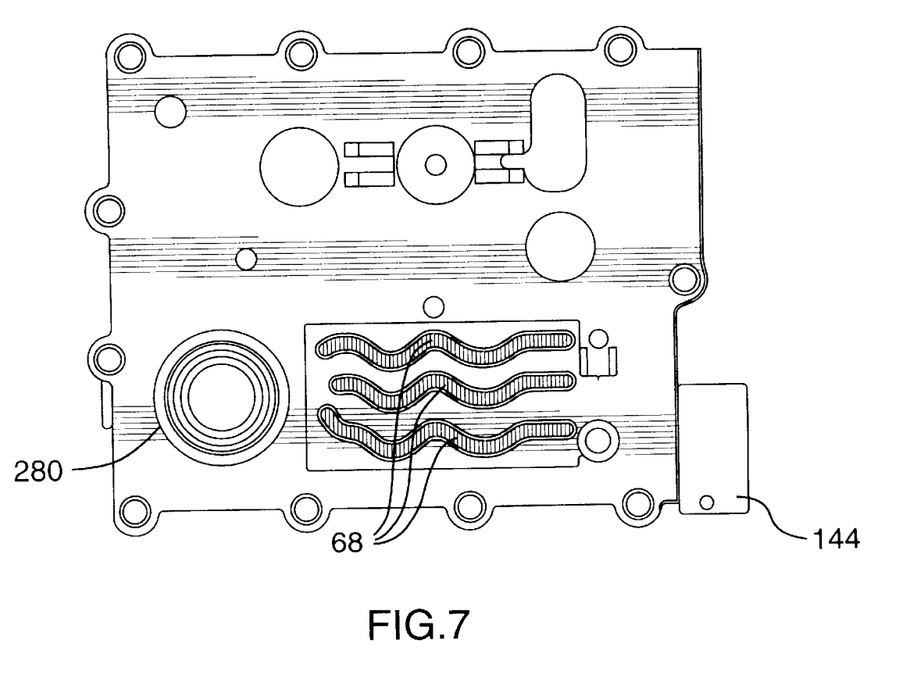
FIG. 7 is a bottom plan view of the top portion of the device.

(c) Recombination in a common, high acceleration rate passage 62 with a number of sine wave excursions;

(d) Dispersion into two parallel paths 64 with a high acceleration rate and three sine wave excursions, 180° path change with respect to passage 62;

(e) Recombination, 180° path change, and dispersion into three parallel sinuous passages 66, which are preferably each divided into two sub-passages by the insertion of similarly configured fins 68 projecting, downwardly from the cover 14 (not seen in FIG. 2 or 6, but visible in section in FIG. 5 and from above in FIG. 7);

(f) Movement through the six parallel, high-acceleration rate passages; and (g) Recombination and centrifuging in chamber 104.

The net result of this passage configuration is that the fuel will have traveled the length of the vaporizer three full times, been split and rejoined three times; it will have been turned through at least 450°, passed through one of five parallel jets, passed through an average of eight sine waves, and will have been finally centrifuged before leaving the vaporizer section.

Referring to FIGS. 2, 3 and 5, as liquid fuel passes through the first stage orifice 30, it enters the fuel chamber 32 which is largely filled by levers 34 and 36, by an actuator pin 60 and by a spring carrier 72, which will be described subsequently in greater detail. The liquid fuel introduced into the fuel chamber 32 is forced out against the walls of the chamber. As can be seen in FIG. 2, the walls of the chamber 32 have a large amount of surface area, preferably including at least thirteen full-height sine-wave "pillars" 74. This chamber acts to transfer heat to the fuel and to create turbulence. Turbulence increases the heat transfer effectiveness, and facilitates the separation of liquid and vapor stages of the fuel.

Referring to FIGS. 2 and 6, the only exit from the chamber 32 is via a plurality of notches 76 in the outboard wall 82. The notches act to create jets which spray fuel directly onto the walls of the passage 62. In a preferred embodiment there are five such notches although more or fewer may be used. Thus, the notches 76 separate the flow into five parallel streams. Passage 62 consists of a long, high-aspect ratio (tall and thin) channel having the shape of six successive full-sine waves. Notably, the channel constituted by the passage 62 is deeper for the first three sine waves, so that any liquid moving along the floor of the passage will tend to be trapped there until vaporized. Various embodiments of the present invention will have, variously: a passage or passages through which fuel passes which will end with either a drop or elevation to the floor in the next passage, or as for passage 62 a lower portion and an elevated portion, or multiple lower and elevated portions within a passage. All such variations serve to promote trapping any liquid moving along the floor of the passage until vaporized within it. It is also to be noted that each of the jets created by the notches 76 will spray fuel tangentially onto the vertical sine wave portion of the passage 62. This flow impingement provides for intimate contact between the liquid fuel and the hot walls of the passage 62. The ensuing, sinusoidal motion acts to fling liquid fuel out against the walls and thus further separates the liquid and gaseous phases of the fuel.

At the end of the sixth sine wave in the passage 62, the channel widens and deepens as it enters a transitional region 86. There is an increase in cross-sectional area at the region 86 which accommodates the lower density of the charge (i.e., some vaporization will have occurred). In the transitional region 86, the fuel is broken into two streams which are then turned 180°, following which they proceed as two passages 64, which are parallel with each other and with passage 62. However, passages 64 are disposed such that movement of the fuel within them is in the opposite direction from fuel movement in the passage 62. Each of the passages 64 has three full sine waves in the flow path. Each leg 64 ends with a raised floor section which acts to trap any liquid fuel being carried along the floor of the channel until it can be vaporized.

The fuel then enters the nearer rightward region as shown in FIG. 2 and seen from above in FIG. 6 where it is recombined into a single stream at a throat region 88, rotated through 90°, and impacted against three full-height obstructions 90. The fuel then enters a section where it is broken into three similar, parallel passages 66. When the device is fully assembled, each of the three passages 66 is divided into two channels by a respective fin 68, thus increasing the acceleration rate of the fluid. The fins 68 and the resulting six flow paths are clearly seen in FIG. 5 and 7. Each of the six passages in this section has two full sine waves of oscillation.

In the normal (warm) state, the fins 68 will receive some heat from the heat exchanger housing by way of conduction through their mating surfaces (heat exchanger to top cover). A secondary purpose of the fins 68 is to provide a means for electrically generated heat to be added to the system for cold start purposes. Referring to FIG. 4, the electric heat is provided by self-regulating, positive temperature coefficient (PTC) heating element "pills" 93, 94 and 95 which are cemented to the top cover 14. Such elements are widely used in automotive applications, and can have state transition temperatures in the range of 100°–175° C. Electrical current from an electrical source 230 passes through a common contact plate 96, thence passes via spring contacts 98 to the pills, and then exits into the metal body to complete the circuit to ground. The entire assembly is held in place with a cover 220, which is screwed into place 222. As the pills 93, 94 and 95 are placed directly over the fins 68, the heat passes through the metal and is available at the fins 68 to help vaporize fuel. The current to the pills 93, 94 and 95 would optionally be controlled by a coolant temperature switch or sensor located in the coolant temperature sensor port 100 (see FIG. 2—shown with dotted lines). Once the coolant temperature reaches a predetermined temperature (such as 5° C.) the current to the heaters would be turned off. The amount of heat generated by the PTC heaters is subject to certain practical considerations. In very low temperature environments automotive batteries are not effective at either releasing or accepting charge. Thus, moderate current levels (e.g. <30 amps) are appropriate. Such current levels would generate enough heat to vaporize 10–15 horsepower worth of fuel, which is enough to allow current engines to start, idle, and warm up quickly. Once engine coolant reaches a moderately warm temperature (e.g. near 0° C.), the coolant-heated vaporizer section could vaporize enough fuel to operate at normal power output levels (i.e., 200+ horsepower) without requiring electrical assistance.

Subsequent to the passage of the fuel through all of the sinuous passages, the fuel is recombined into a single flow path and enters a round chamber 104 (FIGS. 2 and 6) which represents the exit from the vaporizer section. The fuel is directed somewhat tangentially into the chamber 104, giving a centrifuge effect and throwing any retained liquid droplets outwardly against the hot outside walls of the chamber 104. Vapor exits from this chamber and passes through the second regulator stage orifice 280 (see FIG. 7).

The second regulating, stage is best seen in FIG. 4. It is a balanced design that uses a direct-acting spring-diaphragm mechanism to operate a poppet valve. As the valve is balanced, it has no tendency to blow open or shut, and is positioned solely by the force created by the spring-diaphragm mechanism. The vaporized first stage fuel is sourced to the second stage poppet valve 106 when it enters the chamber 104. A spring 108, compressed between a spring tower 110 and the diaphragm piston 112 is opposed by the differential pressure across convoluted, rolling diaphragm 114. That differential pressure is the difference between the atmospheric pressure inside the spring tower and the second stage outlet pressure existing in the region 116. A damper 118 inserted into the diaphragm piston 112 acts to dampen any oscillation of the valve mechanism.

In general, the force from the spring 108 acts to open the valve while output pressure acts to close the valve. The preload of the spring 108 (and hence the second stage pressure setting) can be adjusted via adjustment screw 120 and swivel 122. A pintle 124 has a central bore which communicates the outlet pressure from area 116 to a balance chamber 126. The balanced chamber 126 is sealed from the first stage pressure by a convoluted, rolling diaphragm 130, which has the same effective area as the poppet valve. Thus, valve 106 is balanced. The valve is shown as having an O-ring seal 131, although any type of elastomeric seal could be used. In the first embodiment, the second stage orifice was approximately 0.625 inches in diameter, although other diameters could be chosen in response to actual flow requirements.

Turning now to FIG. 5, there is provided a second stage spring-operated check valve 133 which relieves overpressure in the second stage or downstream system. The relief is to the first stage, which may result in the first stage check valve 40 also relieving to the fuel inlet line. As may be seen in FIG. 5, the second stage outlet flow (and hence pressure) impacts directly on the valve 133 which is located in the top cover 14. The pressure acts directly on an O-ring seal 136 which is fitted around piston 138 of the check valve. The piston 138 is biased upwardly by a spring 140. If the pressure above the relief valve 133 is greater than the pressure exerted by the cantilevered spring 140, the piston 138 moves downwardly, to vent the overpressure into the first stage. A relay switch 141, which is conventional, is bolted to the body 12. The switch 141 turns on and off the electrical current required for cold starts as described above in connection with FIG. 4.

After the fuel has been regulated by the second stage, it passes through a channel to the outlet port 142 as shown in FIG. 1 and 5. The illustrated outlet port is a standard SAE 45° flare port, although a variety of other port types or adapter fittings could be used.

As seen in FIGS. 1, 2, 4 and 8, a female coolant inlet port 144 is provided. Although a standard SAE 45° flare port is shown in FIG. 1, other types could be used.

As can be derived from a study of FIGS. 2, 3, 4, 5 and 8, the coolant heat transfer compartment 52 has numerous ribs, turns, obstructions, sinusoidal sections, turbulence generators, damps and flow splitters to generate high surface-to-volume ratio contact between the coolant and the heat exchanger body. While this section is roughly analogous to the vaporization section described earlier it is somewhat less sophisticated in that the coolant does not change states. The particular configuration of the heat exchanger wall, as seen by the coolant, is not at the focus of the present invention, and does not need to be described in any greater detail. A view of the chambers through which the coolant passes may be seen in FIG. 8 where the general direction of flow is shown with arrows. Tt is worth noting, however, that the sections defining, at least a part of passages 62, 64 and 66 are hollow, with coolant one side and the fuel on the other.

Figure 8:
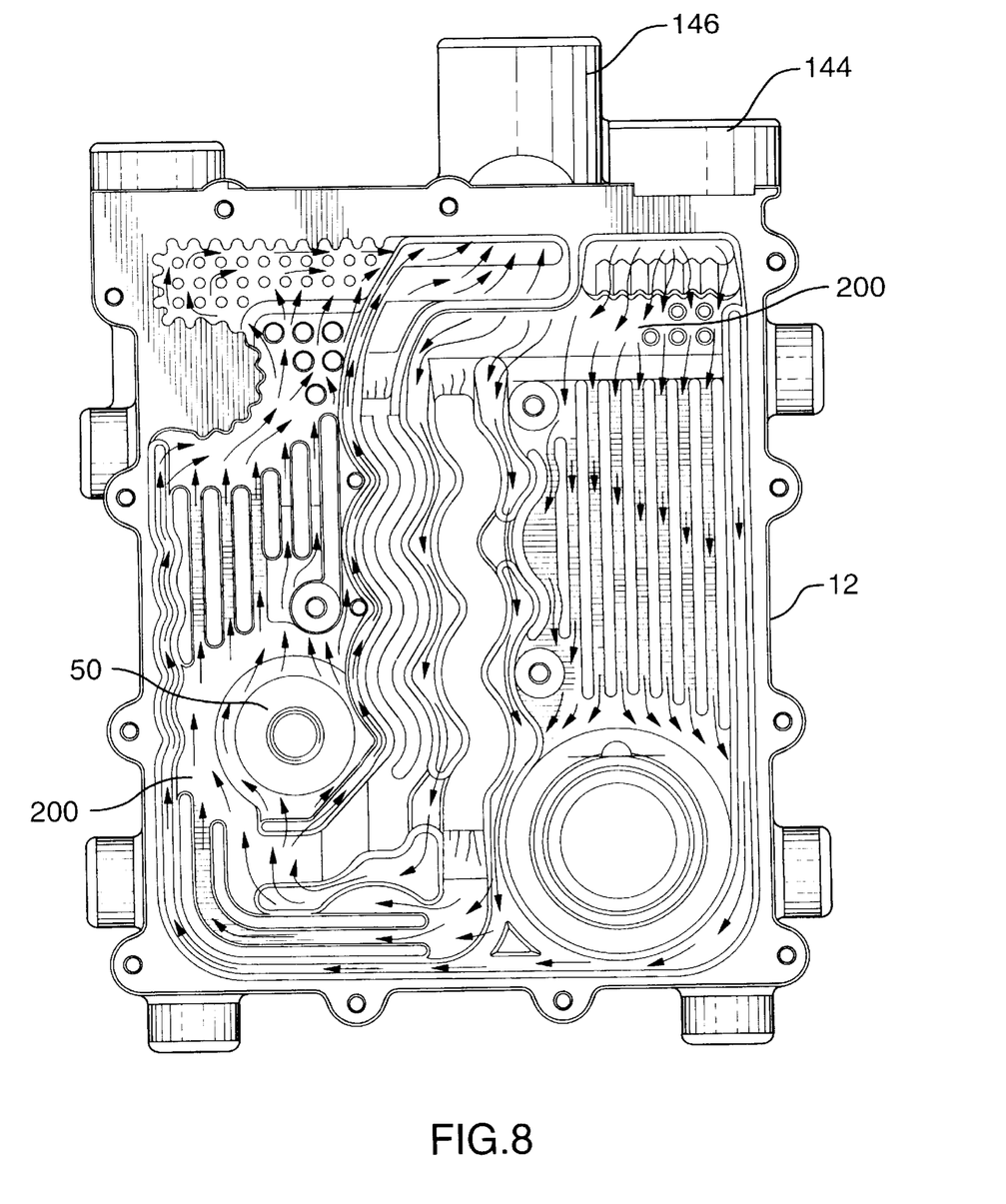
FIG. 8 is a bottom view of flow channels on a coolant side of the device.

FIGS. 1, 2 and 8 clearly illustrate a female coolant outlet port 146. While a standard SAE 45° flare port is shown, other types could be used. In order to attain the largest possible temperature differential between the fuel and the coolant (i.e., to maximize heat transfer) the coolant inlet and outlet orientation are preferred to be as shown.

The present design includes an integral expansion chamber 148 (see FIG. 4) to protect the vaporizer section in case the coolant freezes. As illustrated in FIGS. 1, 3, 4 and 5, the vaporizer has a bottom cover 150 which provides a number of upwardly open rectangular cells 152 which are isolated from the coolant by a rubber coolant diaphragm 154. Under normal conditions, the diaphragm is strong enough to resist the coolant pressure, and the cells are filled only with air. However, in the event that the coolant freezes, the diaphragm stretches and allows the coolant to expand into the cells 152, thus avoiding the possibility of cracking the heat exchanger body.

Although not illustrated, it is possible to use a conventional solenoid, either at the coolant inlet port 144 or at the coolant outlet port 146, in order to control the flow of coolant through the regulator.

The previously described PRV outlet port 46, which is an integral part of the top cover, could be provided as a 45° SAE female flare port. However, other port styles or adapter fittings could be used. The porting is sized to accommodate the maximum anticipated relief flow.

Attention is now directed to FIG. 3 for a detailed description of the construction and operation of the first stage regulator.

Referring, to the sectional view of FIG. 3, when the coil of the solenoid 26 is electrically energized, the pilot piston 156 will lift to expose an axial bleed orifice 158 in the primary piston 160. High pressure fuel will pass through the bleed orifice 158 and equalize the pressure on both sides of the primary piston 160. When the pressures are nearly equal, the magnetic force of the coil is great enough to pull the piston 160 off its seat, whereupon full flow will occur. The sectional view of FIG. 3 shows both pistons 156 and 160 lifted (i.e., full flow condition).

As previously described, fuel passes through a transfer passage 28 to the first regulating stage, which is an unbalanced design and uses a lever-mounted poppet valve to meter the fuel. The lever 34 is actuated by a spring-diaphragm pressure sensing mechanism. The valve imbalance is such that inlet fuel pressure acts to open the first stage valve. The transfer passage 28 makes fuel available at the first stage valve orifice 30. The lever 34, mounted for pivotal movement about a pivot pin 166, is actuated by a spring diaphragm assembly generally shown at 168. The assembly 168 moves the lever 34 to keep the first stage fuel pressure at its nominal level (typical warm calibrations would be in the range of 10–25 psig). The lever 34 has an elastomeric seat 170 to provide for complete sealing of the orifice 30 in the no-flow condition.

The spring-diaphragm assembly 168 includes two concentric, counterwound springs 172 and 174, which are compressed between a diaphragm stop 176 and a spring tower 178. An adjusting screw 180 and a swivel 182 provide a means to adjust spring pre-load, and thus to adjust the pressure setting, of the first stage. The inside of the spring tower 178 can be referenced to atmosphere or to any other desired pressure. A diaphragm 184 provides a seal between the reference pressure (atmosphere) and the first stage pressure, and imparts a force by acting on the diaphragm stop 176. First stage pressure is communicated to this diaphragm through a small port 183. The convoluted, rolling diaphragm 184 is used to eliminate hysteresis due to diaphragm stretch, and to provide essentially constant working area regardless of diaphragm stroke. If the first stage pressure is low, the assembly 168 moves the lever 34 in the opening direction. If the pressure is high, it moves the lever 34 to close the first stage valve. The embodiment illustrated uses a first stage orifice of approximately 0.188" diameter, although other sizes could be selected, based upon the peak flow demands.

A spring-operated first stage check valve 40 (relief valve) relieves overpressure in the first stage back to the inlet chamber of the solenoid 26. Referring to FIG. 5, the first stage pressure is connected to the relief valve 40 through a channel 185 in the top cover. That pressure travels through a central bore 186 in an externally, threaded sleeve 189 and is normally blocked by a piston 39, whose elastomeric seal 190 is held against the seat of the bore by a spring 187. If the force exerted on the piston 39 by the first stage pressure exceeds the force from the inlet pressure by an amount greater than the force exerted by the spring 187, the piston 39 unseats and vents the overpressure to the solenoid inlet chamber. If the resultant settled pressure is greater than the fuel inlet pressure, the overpressure will also feed back into the fuel tank. Notably, even if the solenoid 26 is closed, an overpressure will unseat the pistons of the solenoid, so that the overpressure can be relieved into the tank.

As mentioned earlier, a spring-operated pressure relief valve 44 forms part of the top cover, and relieves any severe overpressure conditions to an external port 46 (see FIG. 1), which is normally vented to the atmosphere. The first stage pressure acts directly on the elastomeric seal of pressure relief valve (PRV) piston 41 (see FIG. 5), tending to push it off of the raised seat of orifice 42. That tendency is opposed by spring 61, which acts to keep the pressure relief valve closed. Appropriate spring selection allows any desired relief pressure to be selected (typical values for low pressure gas (LPG) would be ≧312 psig). If the first stage pressure is higher than the relieving pressure, the piston 41 rises inside the bore orifice 42. The outside diameter of the piston 41 is notched so that flow gaps exist between it and the bore of 42. Relieved gas exits into the area surrounding the spring 61, and connects by a suitable channel to the outlet port 46.

Referring to FIG. 3, under low temperature conditions, the first stage modulator 48 acts to reduce the first stage "set pressure". In that case, a wax element 50 retracts a pin, releasing a spring carrier 72 which is acted upon by springs 58 and 59. In that case, the springs 58 and 59 act to move the carrier 72 downward, engaging the rightward end of the lever 36. The lever 36 pivots in a clockwise direction about a fulcrum 37, contacting the pin 70. That has the effect of placing the lever-ratio'd spring force from springs 58 and 59 in opposition to the force from springs 56 and 57, thus reducing the operating pressure of the first stage regulator. The section illustrated in FIG. 3 shows the low temperature condition with the first stage modulator 48 acting to reduce the operating pressure created by the assembly 168. The large body of the wax element 50 is in intimate contact with the coolant, and thus modulates the first stage pressure based on the coolant temperature. An initial embodiment modulator 48 was set to change states at 15° C. At FIG. 9, the parts of a wax element 50 are shown. In detail, piston 290 moves up and down in position by virtue of guide 310. The lower end of piston 290 resides in a diaphragm 300 which is in contact with a wax pellet 330 which itself is contained in a cup 320. As the temperature changes so too does the consistency of wax pellet 330, which, as already mentioned, modulates the first stage pressure based on coolant temperature.

While one embodiment of this invention has been illustrated in the accompanying drawings and described hereinabove, it will be evident to those skilled in the art that changes and modifications may be made therein without departing from the essence of this invention, and that all such variations and modifications are within the scope of this invention.

We claim:

1. A fuel vaporizer for use with a fuel which tends to liquefy at low temperatures and to vaporize at high temperatures, said vaporizer comprising:

heat-exchange means adapted to transfer heat from a fluid engine coolant to said fuel; and an interface which forms part of said vaporizer and which separates said fuel from said coolant, said heat being transferred by conduction across said interface, said interface comprising a series of successively connected passages intermediate a starting point where said fuel enters said vaporizer and an end point where said fuel exits said vaporizer, each of said successively connected passages, commencing with a passage most proximate said starting point, being of lesser cross-sectional area than an immediately adjacent successively connected passageway progressing in a direction toward said endpoint, to thereby provide successively increasing cross-sectional area to accommodate said fuel as it changes state from mostly liquid at said starting point to mostly gaseous by said end point.

2. A vaporizer according to claim 1, each passage having one or more passageways, the passage proximate said end point having a combined cross-sectional area greater than a combined cross-sectional area of a passage proximate said starting point.

3. The vaporizer according to claim 1, in which said low temperature comprises ambient winter temperature, and wherein said high temperature comprises a temperature above said ambient winter temperature.

4. The vaporizer according to claim 1, in which said low temperature is less than approximately 15° C., and wherein said high temperature is above approximately 15° C.

5. The vaporizer according to claim 1, wherein a passageway proximate said endpoint directs the fuel tangentially into a cylindrical chamber so as to cause swirl of said fuel about a circumferential periphery of the cylindrical chamber.

6. In a fuel vaporizer for use with a fuel that tends to liquefy at low temperatures and to vaporize at high temperatures, said vaporizer having heat-exchange means adapted to transfer heat from a fluid engine coolant to said fuel, wherein heat is transferred by conduction across a metallic interface which forms part of said vaporizer and which separates said fuel from said coolant, wherein:

said vaporizer defines for said fuel a path along which said fuel travels while heat transfer takes place, said path including, in the order encountered by said fuel:

a chamber for receiving said fuel, a single, sinuous passage adjacent said chamber but substantially separated therefrom by a wall which defines a plurality of small-diameter apertures through which fuel in said chamber can be sprayed against a wall of said passage, said passage having one blind end, and having another end toward which said fuel travels and at which said passage branches into two portions through which it communicates with, a pair of sinuous passages generally parallel with each other and with said single sinuous passage, but disposed such that fuel contained therein travels generally in the opposite direction from fuel travel in said single sinuous passage, the cross-sectional area of the combination of said pair of sinuous passages being greater than that of said single sinuous passage, so as to permit expansion of the volume of said fuel as it gradually vaporizes due to said heat input, said pair of sinuous passages at the downstream end thereof communicating with the ends of a triplicity of sinuous passages generally parallel with each other and with said pair of sinuous passages, but disposed such that fuel contained therein travels generally in the opposite direction from fuel travel in said pair of sinuous passages, the crosssectional area of the combination of said triplicity of sinuous passages being greater than that of said pair of sinuous passages, so as to permit further expansion of the volume of said fuel as it continues to vaporize due to said heat input.

7. The vaporizer claimed in claim 6, in which said vaporizer further comprises three sinuous fins, each of said triplicity of sinuous passages enclosing one of said fins without making any substantial contact therewith, said sinuous fins being in contact with said heating means by which they can be heated and thus transfer heat into any fuel disposed in said triplicity of sinuous passages; whereby the presence of said three fins has the effect of converting said triplicity of passages into six smaller-section passages.

8. The vaporizer claimed in claim 7, in which said heating means includes electrical means.

9. The vaporizer claimed in claim 6, in which said single sinuous passage is substantially sinusoidal and defines a concave portion adjacent each of said apertures, said apertures being disposed to spray fuel generally tangentially into said respective concave portion, so as to maximize the vaporization potential of the impact of fuel against said wall.

10. The vaporizer claimed in claim 9, in which said single passage has a lower floor which rises toward said downstream end of said single passage, so that fuel which remains in the liquid state tends to be trapped within said single passage.

11. The vaporizer claimed in claim 10, in which said pair of passages each have a lower floor which rises toward said downstream end thereof, so as to trap fuel that remains in the liquid state.

12. The vaporizer claimed in claim 11, in which, at said downstream end of said pair of passages, said passages merge together to form a unitary flow, said vaporizer further comprising obstruction means at the location where said pair of passages merge, such that impact of said fuel with said obstruction means promotes turbulence in said fuel, thus enhancing heat flow into said fuel.

13. The vaporizer claimed in claim 6, wherein overpressure at a gaseous fuel exit port of said vaporizer is relieved by a check valve having an O-ring seal which is fitted around a piston of said check valve and said piston is biased upwardly by a spring.

14. A fuel vaporizer for use with a fuel, such as propane, that tends to liquefy at low temperatures and to vaporize at high temperatures, said vaporizer having a body comprising:
   means defining a first path for the flow of engine coolant therethrough,
   means defining a second path for the flow of fluid fuel therethrough,
   means defining a heat-exchanger through which heat can be transferred from said coolant to said fuel by conduction across a metallic interface which forms part of said vaporizer and which separates said fuel from said coolant,
   said second path for said flow of fuel including, in the order encountered by said fuel: chamber for receiving said fuel,
   a single, sinuous passage adjacent to said chamber but substantially separated therefrom by a wall which defines a plurality of small-diameter apertures through which fuel in said chamber can be sprayed against a wall of said passage, said passage having, one blind end, and having another end toward which said fuel travels and at which said passage branches into two portions through which it communicates with,
   a pair of sinuous passages generally parallel with each other and with said single sinuous passage, but disposed such that fuel contained therein travels generally in the opposite direction from fuel travel in said single sinuous passage, the cross-sectional area of the combination of said pair of sinuous passages being greater than that of said single sinuous passage, so as to permit expansion of the volume of said fuel as it gradually vaporizes due to said heat input, said pair of sinuous passages at the downstream end thereof communicating with the ends of a triplicity of sinuous passages generally parallel with each other and with said pair of sinuous passages, but disposed such that fuel contained therein travels generally in the opposite direction from fuel travel in said pair of sinuous passages, the cross-sectional area of the combination of said triplicity of sinuous passages being greater than that of said pair of sinuous passages, so as to permit further expansion of the volume of said fuel as it continues to vaporize due to said heat input.

15. The fuel vaporizer claimed in claim 14, in which said vaporizer further comprises three sinuous fins, each of said triplicity of sinuous passages enclosing one of said fins without making any substantial contact therewith, said sinuous fins being in contact with heating means by which said fins can be heated and thus transfer heat into any fuel disposed in said triplicity of sinuous passages; whereby the presence of said three fins has the effect of converting said triplicity of passages into six smaller-section passages.

16. The fuel vaporizer claimed in claim 15, in which said heating means includes electrical means.

17. The fuel vaporizer claimed in claim 14, in which said single sinuous passage is substantially sinusoidal and defines a concave sinusoidal portion adjacent each of said apertures, said apertures being disposed to spray fuel generally tangentially into the respective sinusoidal portion, so as to maximize the vaporization potential of the impact of fuel against the wall.

18. The fuel vaporizer claimed in claim 17, in which said single passage has a lower floor which rises toward the downstream end of the single passage, so as to trap fuel that remains in the liquid state.

19. The fuel vaporizer claimed in claim 18, in which said pair of passages each has a lower floor which rises toward the downstream end thereof, so as to trap fuel that remains in the liquid state.

20. The fuel vaporizer claimed in claim 19, in which, at the downstream end of said pair of passages, said passages merge together to form a unitary flow, said vaporizer further comprising obstruction means at the location where said pair of passages merge, such that impact of said fuel with said obstruction means promotes turbulence in the fuel, thus enhancing heat flow into the fuel.

21. A method of vaporizing a fuel that tends to liquefy at low temperatures and to vaporize at high temperatures, utilizing a vaporizer having heat-exchange means adapted to transfer heat from a fluid engine coolant to the fuel, wherein heat is transferred by conduction across a metallic interface which forms part of said vaporizer and which separates said fuel from said coolant, the method comprising the steps:
   passing said fuel into a chamber defined by said vaporizer,
   then passing, said fuel into a single, sinuous passage adjacent to said chamber but substantially separated therefrom by a wall which defines a plurality of small-diameter apertures, by spraying said fuel through said apertures against a wall of said single passage,
   then passing said fuel into a pair of sinuous passages generally parallel with each other and with said single sinuous passage, whereby said fuel travels generally in the opposite direction from fuel travel in said single sinuous passage, the cross-sectional area of the combination of said pair of sinuous passages being greater than that of said single sinuous passage, so as to permit expansion of the volume of said fuel as it gradually vaporizes due to said heat input,
   then passing said fuel into a triplicity of passages generally parallel with each other and with said pair of sinuous passages, but disposed such that fuel contained therein travels generally in the opposite direction from fuel travel in said pair of sinuous passages, the cross-sectional area of the combination of said triplicity of sinuous passages being greater than that of said pair of sinuous passages, so as to permit further expansion of the volume of said fuel as it continues to vaporize due to said heat input.

22. The method claimed in claim 21, in which said vaporizer includes three sinuous fins disposed such that each of said sinuous passages encloses one of said fins without making any substantial contact therewith, said method including the further step of transferring heat from an outside source to said sinuous fins whereby said fins can be heated and thus transfer heat into any fuel disposed in said triplicity of sinuous passages.

23. The method claimed in claim 22, in which said heat applied to said fins is derived from an electrical source.

24. The method claimed in claim 21, in which said single sinuous passage defines a concave sinusoidal portion adjacent each of said apertures, and wherein, as part of said method, said apertures spray fuel generally tangentially into the respective sinusoidal portion, so as to maximize the vaporization potential of the impact of fuel against the wall.

25. A fuel vaporizer and pressure regulator for use with a fuel that tends to liquefy at low temperatures and to vaporize at high temperatures, said vaporizer and pressure regulator comprising:

spring means;

valve means for regulating pressure of fuel exiting said vaporizer and pressure regulator, said valve means being controlled by a force exerted thereon by said spring means, modulating means for altering said force exerted by said spring means at low temperature to allow said valve means to open to a greater extent in low temperature conditions.

26. The vaporizer and pressure regulator according to claim 25, wherein said modulator means comprises:

a movable member, coupled at one end thereof to said spring means; and a wax element coupled to another end of said movable member, said wax element having a given consistency which changes in accordance with temperature so as to cause movement of said movable member.

27. The vaporizer and pressure regulator according to claim 26, wherein said movable member comprises a piston, said movable member another end being disposed within a diaphragm member, said diaphragm member being in contact with and movable by said wax element upon a change in temperature.

28. A fuel pressure regulator for use with a fuel which tends to liquefy at ambient winter temperatures and to vaporize at temperatures above ambient winter temperatures, said fuel pressure regulator having a pressure regulating stage which comprises:

spring means;

valve means for opening a port to allow fuel to enter said regulator, said valve means being controlled by a force exerted thereon by said spring means; and modulator means for reducing said force exerted by said spring means when temperatures are ambient winter temperatures.

29. The regulator according to claim 28, wherein said ambient winter temperatures are temperatures below about 15° C.

30. The regulator according to claim 29, wherein said modulator means comprises:

a movable member coupled at one end thereof to said spring means; and a wax element coupled to another end of said movable member, said wax element having a given consistency which changes in accordance with temperature so as to cause movement of said movable member.

31. The regulator according to claim 30, wherein said movable member comprises:

a lever arm; and a piston having an end which contacts said lever arm, said lever arm, which acted upon by said piston, reducing the force exerted by said spring means.

32. The regulator according to claim 30, wherein said movable member comprises a piston one end of which resides within a diaphragm member, said diaphragm member being in contact with and movable by said wax element upon a reduction in temperature.

33. The regulator according to claim 30, wherein said change in consistency of the wax element comprises a change in volume.

* * * * *